United States Patent [19]

Miller

[11] Patent Number: 4,476,814

[45] Date of Patent: Oct. 16, 1984

[54] ANIMAL PET MEDICAL COLLAR

[76] Inventor: Marie Z. Miller, 12983 Montford St., Pacoima, Calif. 91331

[21] Appl. No.: 474,564

[22] Filed: Mar. 11, 1983

[51] Int. Cl.$^3$ ............................................. A01K 27/00
[52] U.S. Cl. ..................................... 119/106; 119/96
[58] Field of Search ................ 119/106, 96; 24/115 G

[56] References Cited

U.S. PATENT DOCUMENTS

| | | | |
|---|---|---|---|
| 205,515 | 7/1878 | Von Culin | 119/106 |
| 2,810,368 | 10/1957 | McCombe | 119/106 |
| 2,989,030 | 6/1961 | Draheim | 119/106 |
| 2,998,008 | 8/1961 | Klesa | 119/106 X |
| 3,013,530 | 12/1961 | Zeman | 119/106 |
| 3,036,554 | 5/1962 | Johnson | 119/96 |
| 3,072,098 | 1/1963 | Boemle | 119/106 |
| 3,942,306 | 3/1976 | Kulka | 119/106 |
| 4,328,605 | 5/1982 | Hutchison et al. | 24/115 G |

Primary Examiner—Hugh R. Chamblee
Attorney, Agent, or Firm—John J. Posta, Jr.

[57] ABSTRACT

An improved animal pet medical collar is provided which comprises a self-supporting solid resilient foam body having a doughnut shape formed by a peripheral, generally annular wall defining a central opening adapted to fit around the neck of an animal pet. The wall is wide enough to prevent a pet wearing it from mouthing a part of the pet's body and thus injuring itself by pulling stitches, licking wounds, etc. The body wall has a pair of spaced opposite ends bridged by a drawstring anchored to one of the ends and passing through the other end to the outside of the body, against which it is releasably locked by a spring clamp or the like. The clamp can be a pair of spring-biased tubes with alignable transverse, drawstring-receiving openings. The drawstring can include a spring or be formed of stretchable material. The drawstring can also include an alarm actuable by excess drawstring tension. The collar can further include recessed drawstring detents in a concealed compartment and a cover which bridges the body gap. The collar is simple, inexpensive, durable and efficient.

4 Claims, 5 Drawing Figures

U.S. Patent    Oct. 16, 1984    4,476,814

ANIMAL PET MEDICAL COLLAR

BACKGROUND OF THE INVENTION

1. Field of the Invention

The present invention generally relates to animal medical aids and more particularly to an improved animal pet medical collar to prevent an animal from pulling its stitches, bandages, etc.

2. Prior Art

Animals such as dogs and cats are very popular as pets. When ill, however, they require very careful attention, particularly since they make difficult patients, often tearing out their stitches after surgery, ripping off their bandages, licking and chewing their infected body parts, removing medication, etc. They do not convalesce well in strange environments such as veterinary hospitals and are therefore usually brought home as soon as possible. At home, however, their natural propensity to freely move around is severely hampered if they are trussed up to protect their injured parts from themselves.

Accordingly, so-called Elizabethan collars have been devised to solve the foregoing problems. A device of this type is disclosed in U.S. Pat. No. 3,013,530, which, however, has the disadvantage of providing a large space around the neck, with a multitude of strings spanning the space, making the device difficult to adjust, cumbersome and very vulnerable to entanglement with bushes and other foreign objects.

U.S. Pat. No. 3,036,554 also discloses such a device which, however, is limited in adjustability and, like the device of the above, listed patents, offers little protection and cushioning of the animal.

Devices such as those of U.S. Pat. Nos. 4,036,179 and 4,286,547 are body trusses. As such, they are cumbersome, uncomfortable and annoying and are difficult to instill and adjust. They tend to seriously interfere with normal movements of the pet.

Accordingly, there remains a need for an improved inexpensive, durable and efficient device capable of being simply and rapidly installed and adjusted to fit the pet and providing a comfortable and effective restraint against the pet pulling out its stitches, stripping off bandages, rasping sores, etc. Such device should not interfere with normal movement of the animal and should cushion it against injury, as well as protect it from becoming entangled with shrubbery, etc.

SUMMARY OF THE INVENTION

The improved pet animal medical collar of the present invention satisfies all the foregoing needs. The collar is substantially as set forth in the abstract above. Thus, the collar comprises a solid body of resilient foam, such as plastic, elastomer, etc. capable of effectively protecting the animal against injury by the device and by the environment. The solid body is in the form of an annular wall defining a central opening, that is, is doughnut shaped. The wall is adapted to fit around a pet's neck and is wide enough to prevent the pet from reaching its injured body parts. The wall has opposite ends spaced apart to define a gap extending to the opening, so that the body opening can be expanded to clear the animals' head and narrowed to fit closely around the neck. A drawstring is connected to one of the opposed wall ends, spans the gap and extends through the other wall end to terminate at the outer surface of the body, where it is releasably held by a bayonet-type spring clamp or the like.

In one embodiment the drawstring terminates in a bead releasably held in an opening in a recessed compartment in the collar body, and the gap is covered by a cover so that the collar is entirely smooth, having nothing to snag or hang upon foreign objects.

In other embodiment the drawstring is resilient and stretchable, being made of elastomer and/or including a spring, so that if the collar catches on something, the animal will not strangle. An alarm activated by drawstring tension can be included to alert the owner to such a happening.

Various other features of the invention are set forth in the following detailed description and accompanying drawings.

DETAILED DESCRIPTION OF THE PREFERRED EMBODIMENTS

Figure 1:
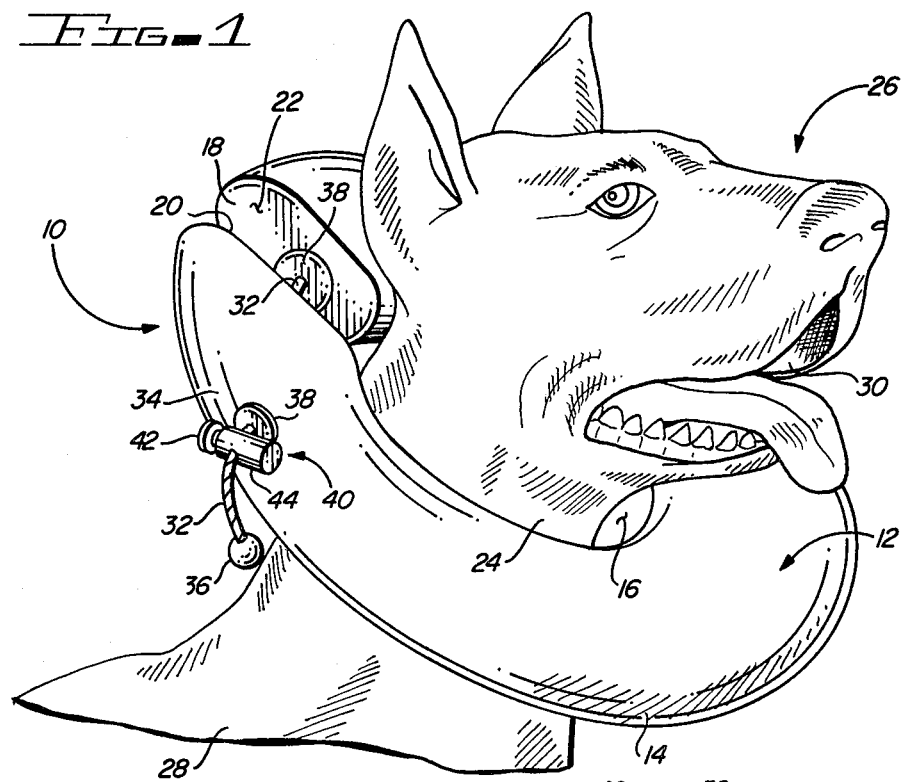
FIG. 1 is a schematic perspective view of a first preferred embodiment of the improved animal pet medical collar of the present invention, shown disposed on the neck of a dog.
Figure 2:
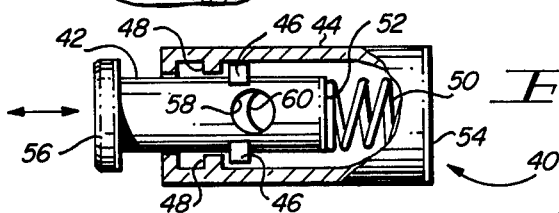
FIG. 2 is an enlarged schematic side elevation, partly broken away, of the releasable spring locking component utilized in the collar of FIG. 1.

FIGS. 1 and 2

Now referring more particularly to FIGS. 1 and 2 of the drawstring, a first preferred embodiment of the improved pet animal collar of the present invention is schematically depicted therein. Thus, collar 10 is shown in perspective view in FIG. 1. Collar 10 comprises a generally annular solid body 12 of self-supporting foamed material, such as polyurethane foam, formed polystyrene or the like plastic. Alternatively, foamed natural and/or synthetic rubber can be used.

Body 12 is light in weight, comfortable to wear, is somewhat resilient and flexible and is doughnut shaped, comprising an annular solid wall 14 defining a central neck receiving space 16.

Wall 14 has two opposed ends 18 and 20 which terminate facing each other to define a gap 22 extending radially from the outer perimeter of wall 14 to central space 16. Gap 22 can be made sufficiently wide to permit collar 10 to be installed on the neck 24 of a pet 26. Wall 14 is of sufficient width so that when collar 14 is worn around the neck 24 of pet 26, as shown in FIG. 1, the pet 26 cannot reach its body 28 with its mouth 30 to rip out stitches, rip off bandages, etc. (not shown). However, wall 14 can be made sufficiently thin (i.e., of sufficiently shallow depth) so that it is very light in weight, and can be made to flex to at least partially widen gap 22 to enable collar 10 to be more easily installed on neck 24. If desired, wall 14 can be made of sufficiently resilient material such that gap 22 can be fully closed and opened by approximating and retracting wall ends 18 and 20.

Collar 10 includes a drawstring 32 of cotton, leather, plastic, metal wire or the like which is connected to end 18, bridges gap 22 and passes through end 20 and outwardly through body 12 to and beyond the outer surface 34 thereof. A ball 36 can be secured to the free outer end of drawstring 32 and various guide rings or grommets 38 can be imbedded in various locations along the path of drawstring 32 through body 12.

Collar 10 also includes a spring clamp 40 releasably cinching drawstring 32 against surface 34, as shown in FIG. 1. As indicated more particularly in FIG. 2, clamp 40 can comprise a cylindrical plunger 42 slideably received in and extending out of a cylindrical housing 44. Plunger bears detents 46 on the outer surface thereof which bear against detents 48 of housing 44 (FIG. 2) and limit the outward movement of plunger 42 to a first position shown in FIG. 2. A spring 50 is interposed between the inner end 52 of plunger and the adjacent end 54 of housing 44 and biases plunger 42 to the described first position. Plunger 42 includes an expanded opposite end 56 against which finger pressure can be exerted to force plunger 42 against spring 50 to compress it and move plunger 42 to a second position in which transverse drawstring 42 receiving openings 58 in plunger 42 and 60 in housing 44 are aligned.

In the first position shown in FIG. 2, openings 58 and 60 are out of alignment and drawstring 42 is pinched tight by plunger 42 so it cannot slip through plunger 42 and housing 44. Therefore, drawstring 42 can be pulled tight to hold collar 10 closed around neck 24 of pet 26. When it is desired to remove from neck 24, plunger 42 is pressed into housing 44 to align openings 58 and 60, clamp 40 is then slid away from body 12, and gap 22 is allowed to expand (by flexing of body 12) after which collar 10 is slipped over the pet's head and removed. The reverse procedure is used to secure collar 10 on pet 26.

Thus, collar 10 is easy to install and use, durable, simple and inexpensive. Its foam construction is light in weight, prevents injury to the pet and effectively prevents the pet from attacking stitches, etc. Moreover, drawstring 32 can be kept short and largely concealed so that it does not get entangled with foreign objects.

FIG. 3

Figure 3:
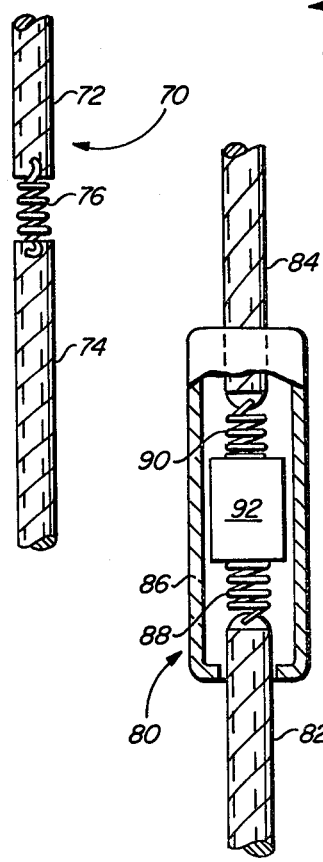
FIG. 3 is an enlarged, fragmentary schematic top plan view of a first modified form of the drawstring used in the collar of the present invention.

A modified version of the drawstring which can be used in the collar of FIG. 1 is shown schematically in FIG. 3. Thus, drawstring 70 is shown which comprises two lengths of cord 72 and 74 connected by a longitudinally extending coil spring 76. Spring 76 imparts sufficient stretchability to drawstring 70 to prevent pet 26 from being discomfitted if collar body 12 is pulled fully tightly around neck 24. It will be understood that, if desired, substantially the same purpose can be accomplished through the use of rubber, elastic or the like as part of or all of drawstring 70.

FIG. 4

Figures 4, 5:
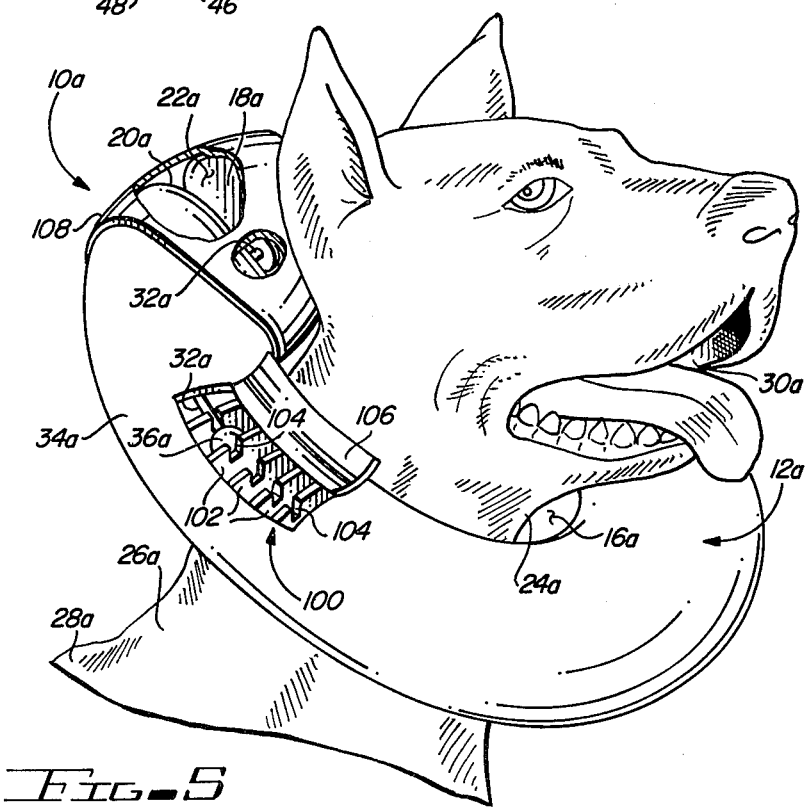
FIG. 4 is an enlarged, fragmentary, schematic side elevation, partly broken away, of a second modified form of the drawstring used in the collar of the present invention, showing a tension actuatable buzzer alarm device incorporated therein.
FIG. 5 is a schematic perspective view of a second preferred embodiment of the improved animal pet medical collar of the present invention.

A further version of the drawstring which can be used in the collar of FIG. 1 is shown schematically in FIG. 4. Thus, drawstring 80 is shown, comprising portions 82 and 84 joined in box 86 by springs 88 and 90 to an alarm 92, in this instance, a buzzer activated by a predetermined tension on springs 88 and 90. This, alarm 92 warns of excess tension on the neck 24 of pet 26, as in the case where collar 10 is applied too tightly to neck 24. Prompt action can be taken by the pet owner to relieve the tension and save the pet from injury.

FIG. 5

A second preferred embodiment of the improved animal pet medical collar of the present invention is schematically depicted in FIG. 5. Thus, collar 10a is shown. Components thereof similar to those of FIGS. 1, 2 and 3 bear the same numerals but are succeeded by the letter "a". Collar 10a comprises a solid resilient body 12a of foamed material formed of an annular wall 14a defining a central space 16a. Opposed wall ends 18a and 20a define a gap 22a leading to space 16a. Collar 10a is fitted around neck 24a of pet 26a and is of doughnut shape and such size as to prevent pet 26a from reaching its body 28a to pull stitches, etc. with its mouth 30a. Collar body 12a can be spread to widen gap 22a, then installed on neck 24 and then gap 22a can be narrowed by pulling ends 18a and 20a toward each other by a drawstring 32a secured to end 18a, bridging gap 22a and passing through end 20a and body 12a to a recessed compartment 100 disposed in outer surface 34a of body 12a.

Compartment 100 is curved and elongated and includes a plurality of spaced transverse walls 102, each with a narrow opening 104 adapted to receive drawstring 32a but not ball 36a secured to the free end of drawstring 32a. Ball 36a can be made to abut the selected wall 102 to hold releasably drawstring 32a in the desired locked position. Compartment 100 of metal, plastic, etc. may have a similarly constructed hinged lid 106 to conceal drawstring 32a. A curved cover 108 of metal, plastic, etc. can be slid over the outer surface 34a of body 12a at ends 18a and 20a and gap 22a to conceal the same. The result is a uniformly smooth collar 10a with drawstring 32a totally concealed but readily accessible for adjustment of collar size on pet 26a. Collar 10a thus presents no surfaces to catch on foreign objects and cause difficulties. Collar 10a otherwise has the same advantages as collar 10, effectively protecting pet 26a from injuring itself by pulling stitches, etc. and from being injured by bumping into furniture, etc. while in a weakened condition. Certain other advantages are as set forth in the foregoing.

Various modifications, changes, alterations and additions can be made in the improved animal pet medical collar of the present invention, its components and their parameters. All such modifications, changes, alterations and additions as are within the scope of the appended claims form part of the present invention.

What is claimed is:

1. An improved animal pet medical collar, said collar comprising, in combination:
   (a) a self-supporting, solid foam resilient body having a peripheral, generally annular wall defining a generally central space, adapted to fit around an animals neck, the opposed ends of said wall collar defining a size adjustment gap and,
   (b) releasably adjustable closing and locking means secured to said collar body for securing said opposed wall ends to each other and thus locking a pet animal in said collar; said means including spring tensioning means,
   (c) wherein said closing and locking means comprises a drawstring secured to one of said opposed wall ends, said drawstring bridging said gap, passing through the other of said wall ends to the outer surface of said body and adjustably releasably locked in place thereagainst by said spring tensioning means, (d) wherein said spring tensioning means comprises a spring-biased clamp which releasably clamps to said drawstring, (e) wherein said drawstring includes elastic lengthening means to prevent accidental injury of a pet wearing said collar, (f) wherein said drawstring includes an alarm which is actuated when the tension on said drawstring exceeds a predetermined limit and wherein said collar body wall is of sufficient width to prevent a pet wearing the collar from mouthing a part of its body.

2. The improved pet medical collar of claim 1 wherein said drawstring includes two portions joined by spring means secured to said alarm actuatable by said spring means.

3. An improved animal pet medical collar, said collar comprising, in combination:

(a) a self-supporting, solid foam resilient body having a peripheral, generally annular wall defining a generally central space, adapted to fit around an animals neck, the opposed ends of said wall collar defining a size adjustment gap and, (b) releasably adjustable closing and locking means secured to said collar body for securing said opposed wall ends to each other and thus locking a pet animal in said collar; said means including spring tensioning means, (c) wherein said closing and locking means comprises a drawstring secured to one of said opposed wall ends, said drawstring bridging said gap, passing through the other of said wall ends to the outer surface of said body and adjustably releasably locked in place thereagainst by said spring tensioning means, (d) wherein said collar body is resilient and generally doughnut shaped and wherein the free end of said drawstring bears an enlargement which is releasably secured to said collar body by cinching against one of a plurality of spaced walls disposed in a recessed compartment in said collar body.

4. The improved pet medical collar of claim 3 wherein said compartment has an openable cover, and wherein said collar includes a cover slideably disposed over said opposed wall ends and gap, thereby concealing said drawstring and preventing entanglement of said collar with foreign objects.

* * * * *